US008505336B2

(12) United States Patent
Connors, Sr. et al.

(10) Patent No.: US 8,505,336 B2
(45) Date of Patent: Aug. 13, 2013

(54) AZS REFRACTORY COMPOSITION

(75) Inventors: Charles W. Connors, Sr., Wilmette, IL (US); Michael W. Anderson, West Chicago, IL (US); Shirish Shah, Carol Stream, IL (US)

(73) Assignee: Magneco/Metrel, Inc., Addison, IL (US)

(*) Notice: Subject to any disclaimer, the term of this patent is extended or adjusted under 35 U.S.C. 154(b) by 889 days.

(21) Appl. No.: 11/820,390

(22) Filed: Jun. 19, 2007

(65) Prior Publication Data

US 2008/0314085 A1   Dec. 25, 2008

(51) Int. Cl.
*C03B 5/43* (2006.01)

(52) U.S. Cl.
USPC .................................................. 65/27

(58) Field of Classification Search
USPC ................................ 65/27; 501/105
See application file for complete search history.

(56) References Cited

U.S. PATENT DOCUMENTS

| | | | |
|---|---|---|---|
| 1,392,317 A | 10/1921 | Fisher | |
| 3,567,473 A * | 3/1971 | Dreyer et al. | 501/104 |
| 3,752,682 A * | 8/1973 | Nameishi et al. | 501/107 |
| 3,885,005 A | 5/1975 | Downing et al. | |
| 4,119,472 A | 10/1978 | Brashear, Jr. et al. | |
| 4,212,680 A | 7/1980 | Schulz | |
| 4,342,597 A * | 8/1982 | Brown | 106/38.27 |
| 5,403,794 A | 4/1995 | Morris et al. | |
| 5,578,538 A * | 11/1996 | Nishikawa et al. | 501/124 |
| 5,900,382 A | 5/1999 | Shaw | |
| 6,158,248 A | 12/2000 | Beppu | |
| 7,074,733 B2 | 7/2006 | Guigonis et al. | |
| 7,176,153 B2 | 2/2007 | Anderson | |
| 2004/0138048 A1* | 7/2004 | Anderson | 501/107 |
| 2004/0266604 A1 | 12/2004 | Guigonis et al. | |

FOREIGN PATENT DOCUMENTS

| | | |
|---|---|---|
| CH | 509950 | 7/1971 |
| DE | 2738974 A1 | 3/1978 |
| DE | 198 45 761 A1 | 4/2000 |
| EP | 0 193 751 A2 | 9/1986 |
| EP | 0 298 860 A1 | 1/1989 |
| EP | 1428807 A2 | 6/2004 |
| FR | 2241512 A1 | 3/1975 |
| GB | 967934 | 8/1964 |
| GB | 993161 | 5/1965 |
| GB | 1184729 | 3/1970 |
| GB | 1194158 | 6/1970 |
| GB | 1283692 | 8/1972 |
| JP | 10212158 | 8/1998 |

OTHER PUBLICATIONS

Extended European Search Report, PCT/US2008/067197, Jun. 9, 2011.
Schulle, W., "Feuerfeste Werkstoffe", Jan. 1, 1990, pp. 224-225, XP002638439, ISBN 3-342-00306-5.
International Search Report, PCT/US2008/067197, Sep. 1, 2008.
International Preliminary Report on Patentability, PCT/US2008/067197, Dec. 22, 2009.
Office Action, issued in Japanese Patent Application No. 2010-513355, dated Jan. 23, 2013.

* cited by examiner

*Primary Examiner* — Joseph S Del Sole
*Assistant Examiner* — Erin Snelting
(74) *Attorney, Agent, or Firm* — Brinks Hofer Gilson & Lione

(57) ABSTRACT

A refractory composition includes a first set of components and a colloidal silica binder. The first set of components includes alumina and zirconia. The colloidal silica binder is provided at 5 wt % to 20 wt % of the dry weight of the first set of components. The refractory composition includes 45 wt % to 75 wt % alumina, 15 wt % to 30 wt % zirconia, and 10 wt % to 30 wt % silica.

15 Claims, No Drawings

AZS REFRACTORY COMPOSITION

FIELD OF THE INVENTION

This invention generally relates to refractory compositions especially useful for furnaces. More particularly, this invention relates to colloidal silica refractories for the lining of furnaces, such as glass and brass furnaces.

BACKGROUND

Glass melting furnaces are refractory lined vessels shaped as containers for melting and holding glass. In the melting operation, the incoming glass making materials are heated to about 2800° F. (1550° C.). The glass-making materials usually include a mixture of cullet and batch materials. Cullet is crushed glass from the manufacturing process. Batch materials include sand (silica), lime (limestone or calcium carbonate reduced to calcium monoxide), soda ash (sodium monoxide), and sometimes other materials such as feldspar, salt cake, and metal oxides. During the melting operation, the cullet melts first to increase the heat transfer to the batch materials and to reduce the melting time.

Glass melting furnaces include pot furnaces, glass tanks, tank furnaces, and the like. Glass may be constructed of separate refractory brick or blocks within a frame. The blocks fit together without mortar and typically are arranged in a rectangular shape to hold molten glass. The mechanical pressure from the frame and outer blocks holds the blocks together. The refractory blocks usually receive considerable wear from the molten glass and the charging of glass making materials. Molten glass is highly corrosive. The refractory blocks usually are made of composite clays having alumina, zirconia, and silica (AZS). The AZS refractory blocks are made from molten material cast into molds, which are machined after hardening. The refractory blocks can become deeply scored and may develop wear spots or portions where the molten glass has eroded or dissolved the refractory. The wear spots typically grow until the refractory fails to hold the molten glass. The wear spots shorten the service life of glass tanks and often are unpredictable, thus disrupting production of molten glass.

Brass furnaces are refractory lined vessels shaped as containers for melting brass. Brass scrap is collected and transported to the foundry where it is melted in the furnace and recast into billets. The furnace is also used to heat up billets extruded the brass into the right form and size. In the melting operation, the incoming brass-making materials are heated to about 2000° F. (1100° C.).

SUMMARY

In one aspect, this invention provides a refractory composition especially useful for furnaces. The refractory composition has been found to provide excellent corrosion resistance. The refractory composition includes a first set of components mixed with a colloidal silica binder. The first set of components includes alumina and zirconia. The colloidal silica binder is provided at 5 wt % to 20 wt % of the dry weight of the first set of components. The refractory composition includes 45 wt % to 75 wt % alumina, 15 wt % to 30 wt % zirconia, and 10 wt % to 30 wt % silica.

In another aspect, a method of preparing a refractory includes providing a first set of components and a colloidal silica binder. The first set of components includes alumina and zirconia. The colloidal silica binder is provided at 5 wt % to 20 wt % of the dry weight of the first set of components. The first set of components is mixed with the colloidal silica binder to form a refractory composition including 45 wt % to 75 wt % alumina, 15 wt % to 30 wt % zirconia, and 10 wt % to 30 wt % silica. The refractory composition is formed on the surface of a furnace.

The foregoing and other features and advantages of the present invention will become apparent from the following detailed description of the presently preferred embodiments, when read in conjunction with the accompanying examples.

DETAILED DESCRIPTION OF THE PREFERRED EMBODIMENTS

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention provides a colloidal silica refractory composition that is especially useful for glass melting furnaces. In particular, the refractory composition includes alumina, zirconia, and silica. The colloidal silica refractory provides surprisingly good resistance to high temperature corrosive environments. The refractory composition disclosed herein may also be used in other types of furnaces, such as brass furnaces.

The refractory comprises a mixture of a colloidal silica binder with a first set of components. The colloidal silica binder is in the range of about 5 wt % through about 20 wt % of the dry weight of the first set of components, preferably between 6 wt % and 12 wt %, more preferably between 7 wt % and 10 wt %. The first set of components includes alumina ($Al_2O_3$), zirconia ($ZrO_2$), and silica ($SiO_2$). The first set of components may be dry or wet and also may include other minerals, a setting agent like magnesia (MgO), and/or a flow modifier.

The alumina, zirconia, and silica provide strength and corrosion resistance. The alumina may be provided by a high aluminum aggregate such as tabular or white fused alumina. The alumina may be reactive or calcined. The zirconia may be provided by zircon flour or a zirconia bearing material. The silica may be provided by fumed silica, mullite (aluminum silicate), microsilica, colloidal silica, or the like. The various components are available from AluChem, Inc. (Reading, Ohio), Alcan, Inc. (Montreal, Canada), and other conventional suppliers.

The colloidal silica binder holds or binds the first set of components together in a monolithic form. The colloidal silica binder includes colloidal silica in water, where the silica is in the range of about 15 wt % through about 70 wt %. In one embodiment, the colloidal silica may have an average particle diameter in the range of about 4 nm through about 100 nm.

In one embodiment, the refractory composition does not include an effective amount of any other type of binder, such as a hydraulic cement binder. The refractory composition may include less than 1 wt % hydraulic cement. The refractory composition may include less than 2%, 1%, 0.5%, or 0.15% CaO or $CaCO_3$ by weight. Hydraulic cements typically include lime ($CaCO_3$) and/or limestone (CaO), along with other minerals such as alumina and silica. Refractory materials that include cement tend to be difficult to dry when setting, especially at lower temperatures. Further, some cement refractories can generate low melting phases at the high temperatures typical of glass melting furnaces, thus leading to higher corrosion rates.

The first set of components may include 30 wt % to 60 wt % alumina, 20 wt % to 50 wt % zircon, 10 wt % to 30% mullite, and up to 10 wt % silica. The median particle size of the first set of components may be greater than 40 microns. At least 50 wt % of the first set of components may include particles greater than 400 microns. It is known that particle size effects the properties of the liquid refractory compositions (such as pumpability), as well as the mechanical and chemical properties of the final refractory. Proper particle provides good particle packing for reduced porosity, which leads to greater strength and less glass penetration in the refractory. The particle size of the refractory material allows for a multi-functional material which can be easy shotcreted, pumped or cast.

The first set of components preferably includes less than 15 wt %, 10 wt %, or 5 wt % fused AZS particles, and may include no fused AZS particles. Fused AZS particles consist of particles each comprising alumina, zirconia, and silica. In contrast, the present composition preferably does not include fused AZS particles. Instead, the first set of components includes particles selected from alumina, zircon, silica, mullite, and the like.

Preferably, the first set of components includes about 35 wt % to 55 wt % alumina, more preferably 40 wt % to 50 wt % alumina. The alumina particles preferably have an average particle size greater than 1 mm. The first set of components may include 30 wt % to 50 wt % alumina of mesh size 8×14 and 2 wt % to 10 wt % alumina of mesh size −14M. The first set of components may include up to about 5 wt % reactive alumina.

Preferably, the first set of components includes 25 wt % to 45 wt % zircon, more preferably 30 wt % to 40 wt % zircon. Preferably, the first set of components includes up to 5 wt % silica, more preferably up to about 2 wt % silica. The first set of components may contain no silica. Preferably, the first set of components includes 15 wt % to 25 wt % mullite.

Other proportions of the first set of components may be used. The first set of components may include other compounds such as a setting agent. The first set of components may include about 0.1 wt % magnesia as a setting agent. The amount of setting agent may be adjusted to increase or decrease the setting time for the colloidal system refractory. The first set of components also may include a flow modifier to enhance or alter the flow properties for forming the colloidal silica refractory prior to setting. The first set of components may be mixed prior to the addition of the colloidal silica binder.

The resulting refractory composition includes about 45 wt % to 75 wt % alumina, 15 wt % to 30 wt % zirconia, and 10 wt % to 30 wt % silica. The refractory composition may include 50 wt % to 70 wt % alumina, 55 wt % to 65 wt % alumina, or about 60 wt % alumina. The refractory composition may include 18 wt % to 27 wt % zirconia, 20 wt % to 25 wt % zirconia, or about 22 wt % zirconia. The refractory composition may include 12 wt % to 26 wt % silica, 15 wt % to 25 wt % silica, or about 18 wt % silica.

The refractory composition may be cast into blocks for subsequent use in a glass tank or other furnace, or may be formed directly onto the wear portion of a glass tank or other furnace. Besides glass furnaces, the refractory composition may be used in brass, copper, and bronze furnaces. The refractory composition may be formed on the wear portion using one or more refractory forming methods such as casting, pumping, or shotcreting (formless pumping with a setting accelerant). The refractory composition may be formed on one or more portions of the sidewall or hearth. The refractory composition may be formed directly on the wear portion without the replacement of refractory blocks in a glass melting furnace.

EXAMPLES

Example 1

For illustration purposes and not as a limitation, Table 1 provides exemplary types and proportions of first set of components for the colloidal silica refractory system.

TABLE 1

| Raw Material | Mesh Size | Comparative Example A Wt % | Example 1 Wt % |
|---|---|---|---|
| Tabular Alumina | 8 × 14 | 37.7 | 30.5 |
| Tabular Alumina | −14M | 4.7 | 3.8 |
| Reactive Alumina (e.g., CAR 120B) | −325M | 4.7 | 3.8 |
| Calcined Alumina (e.g., CAR 60RG) | −325M | 9.4 | 7.6 |
| Zircon Flour | −325M | 16.5 | 15.3 |
| Zircon Sand | | 0 | 19.1 |
| Fumed silica | | 2.4 | 0 |
| White fused mullite | | 23.5 | 19.1 |
| Al powder | | 0.9 | 0.8 |
| Surfactant | | 0.05 | 0.04 |
| MgO 98% | −200M | 0.09 | 0.08 |

For each Example, the first set of components was mixed together prior to mixing with the colloidal silica binder. The colloidal silica binder was provided at a wt % of about 7% to about 10% by weight of the first set of components. The mixture cured into a colloidal silica refractory. The formula of Comparative Example A yielded a refractory containing about 75 wt % alumina, about 11 wt % zirconia, and about 14 wt % silica. The formula of Example 1 yielded a refractory containing about 60 wt % alumina, about 22 wt % zirconia, and about 18 wt % silica. Thus, the refractory of Example 1 had a higher amount of zirconia than the refractory of the Comparative Example.

To simulate the harsh conditions in a glass melting furnace, refractory corrosion tests were performed on the colloidal silica refractories to evaluate their resistance to molten glass. Thin (0.5 inch diameter) columns or pencils of the refractory compositions were prepared. The fingers were dipped into molten glass at a high temperature. The tests were run for 72 hours at 1232° F. After the test, the samples were cooled and analyzed to determine the resistance of the refractory composition to the harsh conditions. The test was repeated for each sample for a total of two tests for each composition. The cross sectional area of the pencil lost during the test was measured and the results were averaged. The pencil prepared from the formula of Comparative Example A lost an average of 65.3% of its cross-sectional area. The pencil prepared from the formula of Example 1 lost only an average of 39.6% of its cross-sectional area. Thus, the pencils prepared from the composition of Example 1 were surprisingly resistant to corrosion. Thus, the colloidal silica refractories disclosed herein show superior resistance under harsh conditions compared to a prior art refractory.

Example 2

To simulate the harsh conditions in a glass melting furnace, refractory corrosion tests were performed to evaluate resistance to sodium hexametaphosphate. Thin pencils of the refractory compositions of Example 1 and Comparative Example A were prepared. The pencils were dipped into sodium hexametaphosphate at a high temperature. The tests were run for 48 hours at 1093° C. (2000° F). After the test, the samples were analyzed to determine the resistance of the refractory composition to the harsh conditions. The pencil prepared from the formula of the Comparative Example lost about 43% of its cross sectional area. The pencil prepared from the composition of Example 1 was surprisingly resistant to corrosion and lost less than 8% of its cross sectional area.

Example 3

A composition prepared according to Example 1 was applied in a brass furnace. The furnace was operated for a period of time and the composition was found to perform well throughout the furnace. Comparative Example B included an alumino-silicate refractory (65% alumina, 32% silica) applied above the bath line in the furnace and an alumina-silicon carbide material (74% alumina, 17.5% silicon carbide, 6% silica) applied below the bath line. For Comparative Example B, the alumino-silicate product worked well above the bath line and the alumina-silicon carbide product worked well below the bath line, but neither material held up at the interface. The composition of Example 1 showed superior performance to the composition of Comparative Example B, especially at the bath line.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

The invention claimed is:

1. A method of preparing a refractory, comprising:
    providing a first set of components comprising alumina and zirconia,
    wherein the first set of components comprises 35 wt % to 55 wt % alumina particles and 25 wt % to 45 wt % zircon particles, and
        wherein the zirconia comprises
        a first portion having a larger particle size, the first portion comprising zircon sand and
        a second portion having a smaller particle size, the second portion comprising zircon flour; and
    providing a colloidal silica binder at 5 wt % to 20 wt % of the dry weight of the first set of components,
    mixing the first set of components with the colloidal silica binder to form a refractory composition comprising 55 wt % to 65 wt % alumina, 20 wt % to 25 wt % zirconia, and 15 wt % to 25 wt % silica; and
    forming a monolithic refractory composition on a surface of a furnace.

2. The method of claim 1 wherein the furnace is a glass furnace.

3. The method of claim 1 wherein the furnace is a brass furnace.

4. The method of claim 1 wherein the refractory composition does not include an effective amount of a hydraulic cement.

5. The method of claim 1 wherein the first set of components comprises less than 5 wt % fused AZS particles.

6. The method of claim 1 wherein the first set of components comprises 30 wt % to 50 wt % alumina particles of mesh size 8×14 and 2 wt % to 10 wt % alumina particles of mesh size −14M.

7. The method of claim 1 wherein the first set of components comprises alumina particles with an average particle size greater than 1 mm.

8. The method of claim 1 wherein the silica binder is at 6 wt % to 12 wt % of the dry weight of the first set of components.

9. The method of claim 1 wherein the refractory composition is formed by a method selected from casting, pumping, and shotcreting.

10. The method of claim 1 further comprising the step of contacting the refractory composition with molten glass.

11. The method of claim 1 wherein the first set of components comprises about 45.7 wt % alumina and about 34.4 wt % zircon.

12. The method of claim 1, wherein at least 50% of the first set of components includes particles greater than 400 microns.

13. The method of claim 1, wherein the first set of components comprises 30 wt % to 40 wt % zircon.

14. The method of claim 1, wherein the refractory composition comprises about 60 wt % alumina, about 22 wt % zirconia, and about 18 wt % silica.

15. A method of preparing a refractory, comprising:
    providing a first set of components comprising alumina and zirconia, wherein the median particle size of the first set of components is greater than 40 microns,
    wherein the first set of components comprises 35 wt % to 55 wt % alumina particles and 25 wt % to 45 wt % zircon particles, and
        wherein the zirconia comprises
        a first portion having a larger particle size, the first portion comprising zircon sand and
        a second portion having a smaller particle size, the second portion comprising zircon flour; and
    providing a colloidal silica binder at 5 wt % to 10 wt % of the dry weight of the first set of components,
    mixing the first set of components with the colloidal silica binder to form a refractory composition comprising 55 wt % to 65 wt % alumina, 20 wt % to 25 wt % zirconia, and 15 wt % to 25 wt % silica; and
    forming a refractory composition on a surface of a furnace.

* * * * *